J. L. MAGUIRE.
SECTIONAL DEMOUNTABLE RIM.
APPLICATION FILED SEPT. 22, 1916.
1,249,979.
Patented Dec. 11, 1917.
2 SHEETS—SHEET 1.
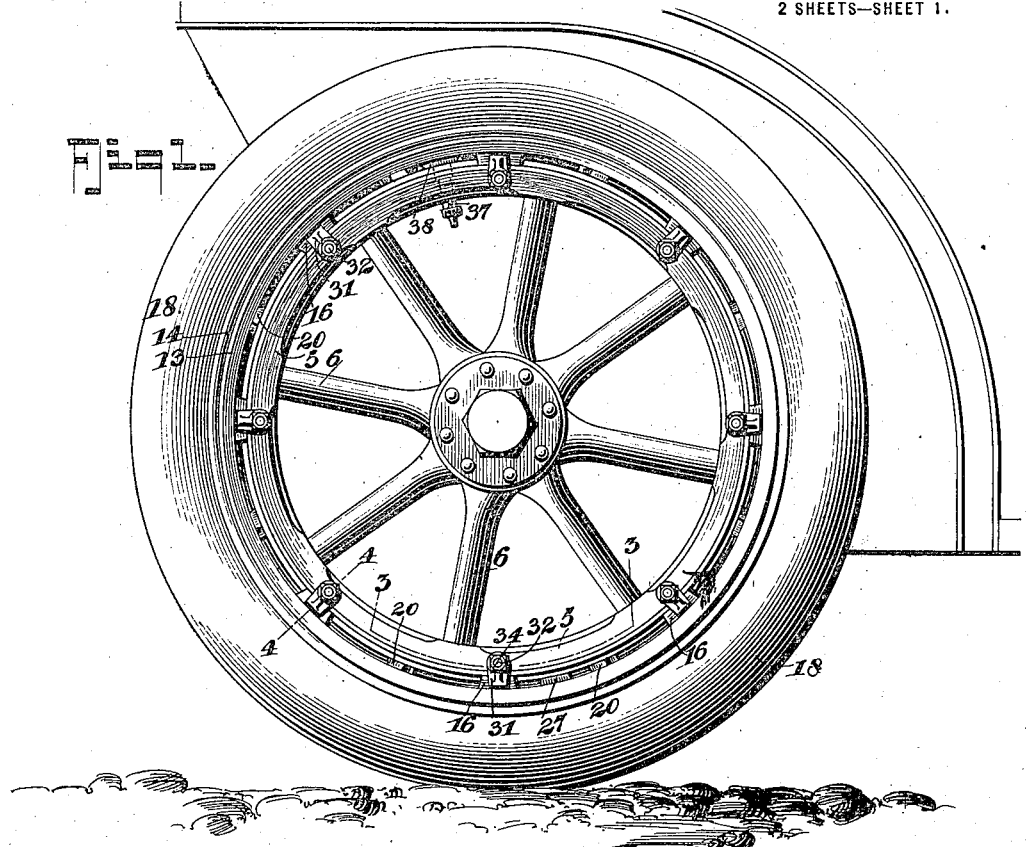
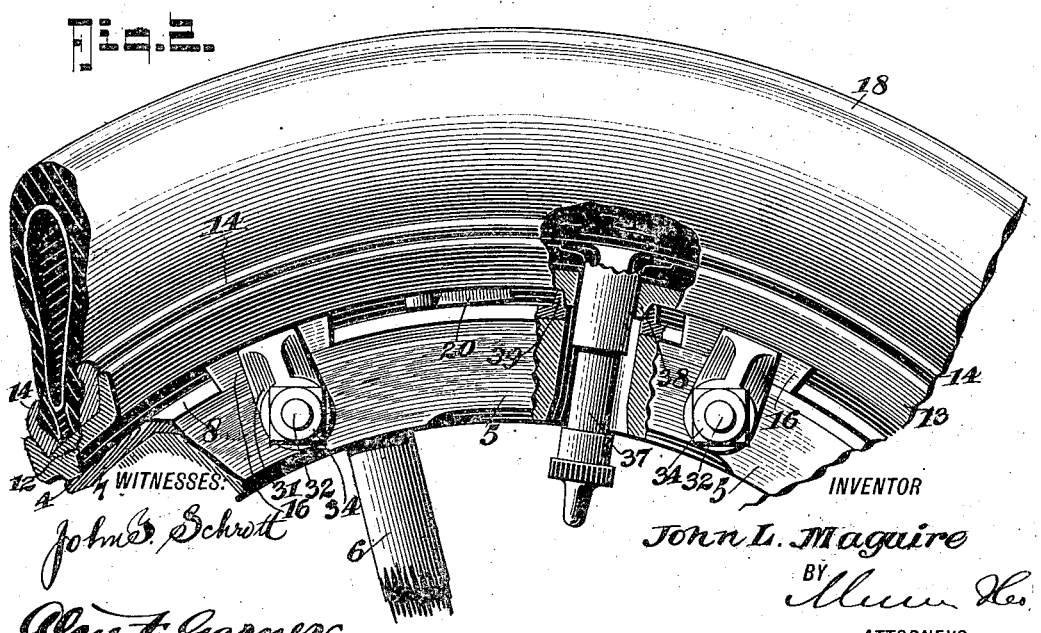

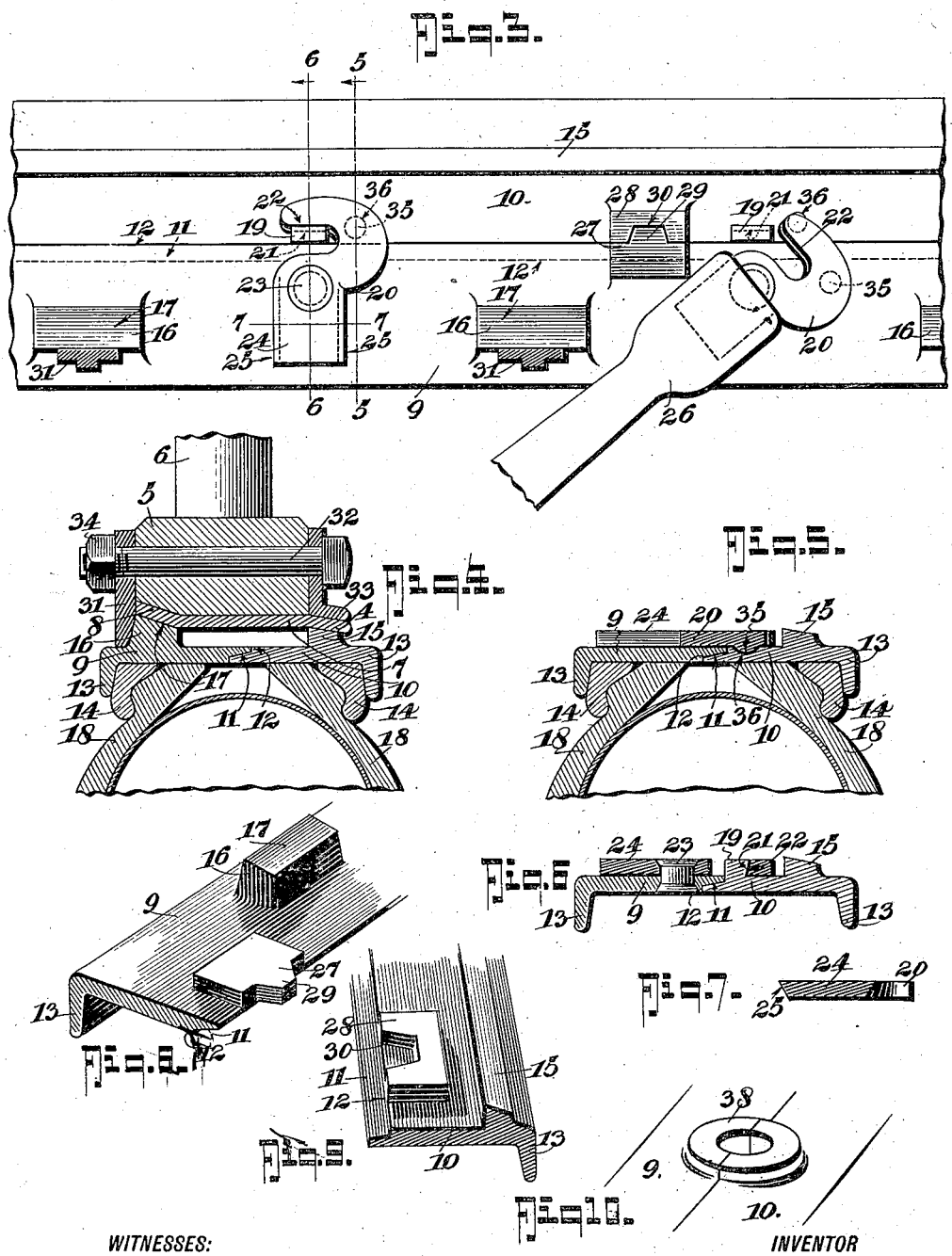

UNITED STATES PATENT OFFICE.

JOHN LAWRENCE MAGUIRE, OF ELKINS, WEST VIRGINIA, ASSIGNOR OF ONE-FOURTH TO SILAS B. HAFFNER, OF ELKINS, WEST VIRGINIA.

SECTIONAL DEMOUNTABLE RIM.

1,249,979.   Specification of Letters Patent.   Patented Dec. 11, 1917.

Application filed September 22, 1916. Serial No. 121,599.

*To all whom it may concern:*

Be it known that I, JOHN L. MAGUIRE, a citizen of the United States, and a resident of Elkins, in the county of Randolph and State of West Virginia, have invented a certain new and useful Improvement in Sectional Demountable Rims, of which the following is a specification.

One of the principal objects of my invention is to provide an improved sectional demountable rim for automobile wheels, having improved features for locking the sections of the rim together and for centering the sections relatively to each other before the locking action takes place.

Still another object of the invention is to provide an improved device of the class described which will be extremely simple, durable, efficient in operation, and inexpensive to manufacture.

With these and other objects in view which will become apparent as the description proceeds, the invention resides in the construction, combination, and arrangement of parts hereinafter more fully described and claimed, and illustrated in the accompanying drawing in which like characters of reference indicate like parts throughout the several figures, of which—

Figure 1 represents a side elevational view of an automobile wheel equipped with a sectional demountable rim constructed according to my invention.

Fig. 2 represents a fragmentary elevational view partly in section.

Fig. 3 represents a plan view of a section of the rim, taken partly in section on line 3—3 of Fig. 1.

Fig. 4 represents a view in section taken vertically and transversely on the plane indicated by the line 4—4 of Fig. 1.

Fig. 5 represents a view in section taken vertically and transversely on the plane indicated by line 5—5 of Fig. 3.

Fig. 6 represents a similar view taken on the plane indicated by the line 6—6 of Fig. 3.

Fig. 7 represents a view in section taken on the plane indicated by the line 7—7 of Fig. 3.

Fig. 8 represents a fragmentary view in perspective of one of the rim sections, showing one element of the device for centering the sections.

Fig. 9 represents a fragmentary perspective view of the opposite section, showing the other centering element.

Fig. 10 represents a fragmentary perspective view showing the flange around the valve opening in the removable rim.

Referring more particularly to the drawing, 5 indicates the felly of an automobile wheel supported by the spokes 6, and at 7 is indicated a band or rim of metal permanently secured on the periphery of the felly 5. The band is provided with the usual beveled rim seats 8 and 4 arranged respectively at the outer and inner edges of the wheel.

The detachable rim includes an outer section 9 and an inner section 10, the joint between the sections occurring circumferentially of the detachable rim and approximately midway between its lateral edges. These rim sections are provided with interfitting beveled faces 11 terminating at their inner edges in shoulders 12. The beveled faces serve to allow ready engagement of the rim sections one with the other, and the shoulders serve to limit their movement toward each other and further serve to take up the lateral strain imparted to the rim sections when they are clamped together. At its outer edge, each rim section is provided with an outstanding flange 13, which flanges serve to retain the clencher rings 14 in place in the usual manner.

The rim section 10 is provided on its inner face with a circumferentially extending flange 15 provided with a beveled face which fits against the beveled or inclined seat 4. The rim section 9 is provided at spaced intervals on its under face and near its outer edge, with supporting lugs 16 which are provided with lower beveled faces 17 fitting against the beveled or inclined rest 8.

The detachable rim, as it will be understood, carries the pneumatic tire 18, which is of ordinary construction, in the manner shown, the clencher rings 14 operating to retain the tire in place upon the rim. The tire may be inflated of course while on the rim and before the latter is secured to the wheel, and of course when the rim is detached, the tire comes off with it.

The sections of the rim are adapted to be secured together through the action of a number of series of lugs and hooks, the lugs being indicated at 19 and the hooks generally at 20. These locking devices are arranged at intervals around the rim, and occur each between adjacent supporting lugs 16. The locking lugs 19 are preferably formed integrally with the inner rim section 10, and alongside the shoulder 12, the lugs being shown substantially rectangular in formation. The inner faces of the lugs, or those adjacent the flange 15, are beveled inwardly as at 21, and the faces 22 of the hooks 20, which are adapted to engage with the lugs 19, are beveled outwardly to conform with the angle at which the faces 21 of the lugs are beveled. Each of the hooks 20 is pivotally mounted upon a stud, or is otherwise pivotally secured to the rim section 9, at the point 23, which is in lateral alinement with the center of the adjacent locking lug 19. It will be noted that the shanks 24 of the hooks are of such length as not to extend outwardly beyond the lateral edge of the rim section 9, but terminate at a point well within its outer edge. The lateral edges of the shank 24 of each hook, are beveled as indicated at 25, see Fig. 7, so as to receive a recessed wrench 26, as indicated in Fig. 3, the recess having its side walls beveled to conform with the angle at which the beveled faces 25 of the shank of the hook lie. This wrench 26, is used in swinging the hooks into and out of engagement with the lugs 19, and it is to be noted that when the hooks are in engagement with the lugs, the rim sections are drawn tightly together and held against lateral displacement relatively to each other.

Arranged around the rim at intervals preferably at points near the locking means, are the centering devices including each a lug 27 carried by the outer rim section 9, and another lug 28 carried by the inner rim section 10. These lugs are arranged adjacent the inner lateral edges of the rim sections, and lug 27 is provided with a wedge shaped or tapered tongue 29 adapted to fit within a wedge-shaped or tapered recess 30 provided in the lug 28. Thus when the sections are being brought together, the tongue 29 engaging in the recess 30 will properly guide the rim sections together so that the lugs 19 will be properly positioned opposite the hooks with which they are to be engaged. These centering devices also act in assisting the hooks and lugs to prevent relative circumferential movement of one rim section relative to the other.

The detachable rim as a whole is retained in place upon the band or rim 7 through the medium of a plurality of metallic keepers 31 which conform in number with the supporting lugs 16, and which are each pivotally carried upon one of a number of bolts 32 passing through the felly 5 of the wheel. These bolts support the keepers 31 on the outer side of the wheel, and on the inner side thereof support a ring 33 having an outturned flange against which the inclined seat 4 rests.

The keepers 31 are retained in locked position against the supporting lug 16 through the medium of nuts or other fastening means 34 carried by the bolts 32. The rim is thus retained in position upon the wheel. Whenever it is desired to remove the rim, the nuts 34 are loosened and the keepers 31 swung about until they become disengaged from the supporting lugs 16, whereupon the rim, carrying with it the tire, may be shifted laterally off of the wheel.

Means is provided for retaining the hooks 20 against accidental disengagement from the lugs 19, and this means takes the form of a knob or protuberance 35 formed on the under face of the hook and adapted, when the latter is in locking position, to drop within a recess 36 formed in the inner rim section 10 adjacent the lug 19. Thus when the hook is in locking position the knob or protuberance 35 engaging in the recess 36 will retain said hook against accidental disengagement. When the rim is in position, it will be understood that the shanks of the hooks do not extend beyond the rim, but are housed and protected between the detachable rim and the permanent rim.

Carried on the permanent rim 7 on opposite sides of the opening formed in the rim through which the valve stem 37 passes, are the lugs 39. Between these lugs the flange 38 engages, and thus circumferential creeping movement of the detachable rim is prevented. The lugs 39 extend transversely of the rim 7, so that no interference with the ready detachment of the sections of the detachable rim will be experienced.

Referring more particularly to Fig. 2, it will be seen that the detachable rim is provided at one point with an opening for receiving the inflating valve 37 of the pneumatic tire. This opening is preferably formed by equally recessing the opposite sections of the rim, and by thickening or flanging the rim sections around these recesses as at 38, this flange extending inwardly toward the permanent rim 7.

Although I have described the preferred embodiment of my invention, I may desire to make such changes in the construction, combination, and arrangement of parts thereof, as do not depart from the spirit of the invention and the scope of the appended claims.

I claim:—

1. A demountable rim for use with a permanent rim and comprising an inner and an outer section having interlocking shoulders formed at their inner edges, interengaging guiding means carried on the under face of the inner and outer sections for guiding the sections together, means for locking said sections together, consisting of lugs carried by the inner section, each having an inwardly beveled face, and hooks carried by the outer rim section, said hooks each having a beveled face to engage against the beveled faces of the lugs, said hooks also each provided with a shank terminating short of the outer edge of the section on which they are mounted.

2. A demountable rim including an inner and an outer rim section, lugs carried by the inner section having beveled edges, hooks carried by the outer section pivoted at points laterally opposed to the lugs, said hooks being provided with beveled edges adapted to engage against the beveled edges of the lugs, knobs carried on the under faces of the hooks and adapted to engage in recesses provided in the first-mentioned section when the hooks are in engagement with the lugs, and shanks carried by the hooks and adapted to be engaged by a wrench whereby the hooks may be manipulated.

JOHN LAWRENCE MAGUIRE.

Copies of this patent may be obtained for five cents each, by addressing the "Commissioner of Patents, Washington, D. C."